Sept. 10, 1968     L. STEINBRECHER ETAL     3,401,065
AUTOMATIC CONTROL OF NITRITE ADDITION IN ACID
PHOSPHATE COATING SOLUTIONS
Filed Aug. 18, 1964     3 Sheets-Sheet 1

INVENTORS
Lester Steinbrecher
Dwight E. Buczkowski
James W. Harrison
BY Synnestvedt & Lechner
ATTORNEYS

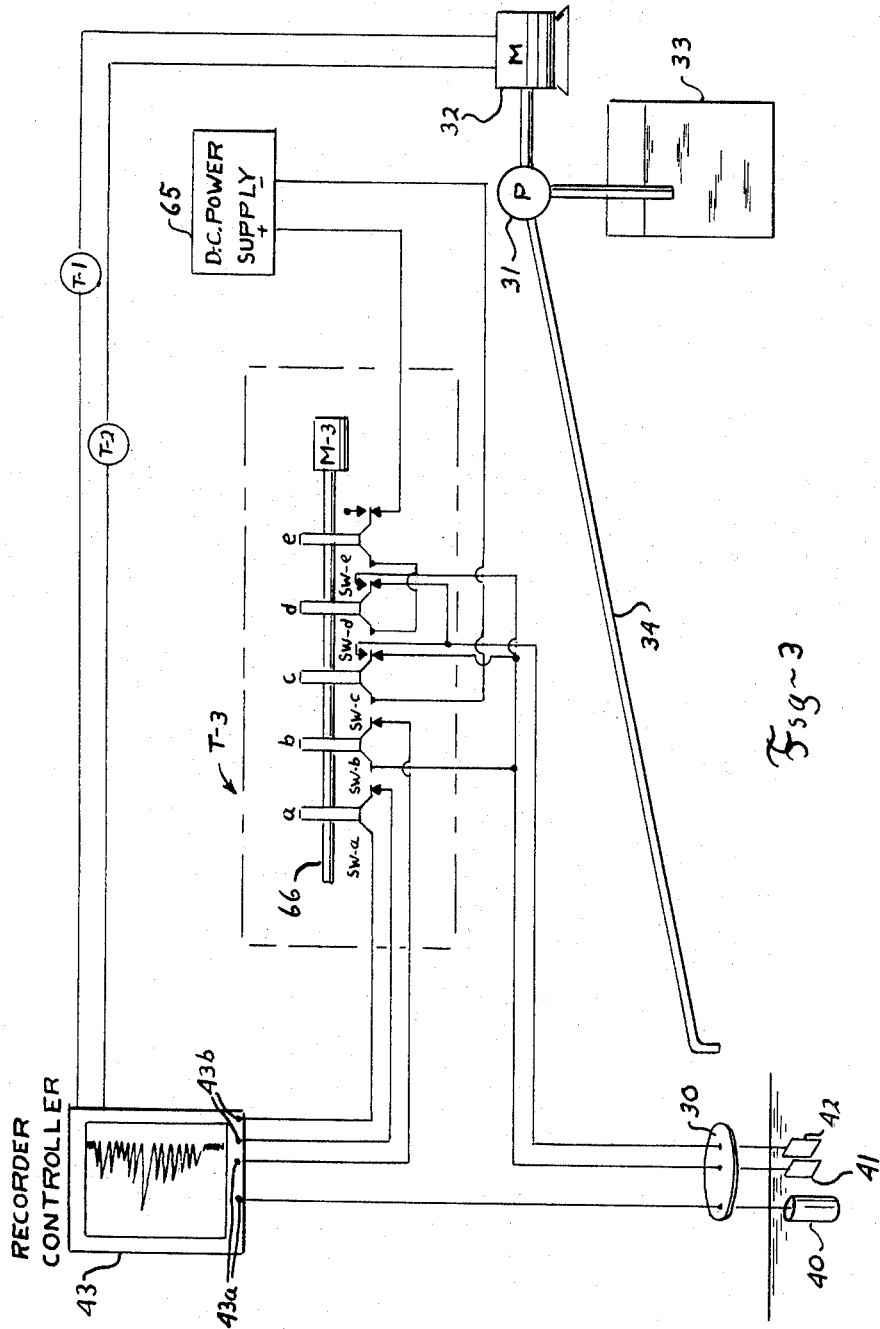

United States Patent Office 3,401,065
Patented Sept. 10, 1968

3,401,065
AUTOMATIC CONTROL OF NITRITE ADDITION
IN ACID PHOSPHATE COATING SOLUTIONS
Lester Steinbrecher, Southampton, Dwight E. Buczkowski, Philadelphia, and James W. Harrison, Wyndmoor, Philadelphia, Pa., assignors to Amchem Products, Inc., Ambler, Pa., a corporation of Delaware
Filed Aug. 18, 1964, Ser. No. 390,375
14 Claims. (Cl. 148—6.15)

ABSTRACT OF THE DISCLOSURE

The production of protective coatings on ferriferous metal surfaces by the use of zinc and/or calcium phosphate coating solutions results in the production of ferrous ion in the coating bath, with detrimental results. A pair of redox electrodes, one of which is inert and the other of which is a reference electrode, are placed in the coating solution, and the voltage developed across said electrodes is used to regulate addition of nitrite material for the purpose of removing ferrous ion from the bath. The voltage developed across the electrodes follows the work loading of the bath and provides a measure of the rate of nitrite demand. The inert electrode is preferably periodically cleaned by being first made anodic and then cathodic. In installations where work loading varies widely, nitrite is preferably added at two or more different rates in response to selected variations in the voltage. System stability in enhanced by limiting the frequency with which nitrite is added in response to voltage changes.

---

This invention relates to the art of producing phosphate coatings on ferriferous metal surfaces and, more particularly, to improvements in the use of phosphate coating solutions containing metals such as zinc and calcium which become part of the coating on the ferriferous metal. Solutions or baths of this type tend to accumulate ferrous ion from the work which is being coated and this, of course, tends to reduce the speed of coating and to alter the quality of the coating adversely for many applications. To overcome this difficulty it has been the practice to convert the ferrous ion by oxidizing it to the ferric form which forms is almost insoluble in the baths so that it precipitates as a sludge which is easily separated or removed from the bath by decantation, filtration or other familiar technique. One of the most commonly employed means for accomplishing this oxidation is to add a soluble nitrite to the bath at more or less regular intervals and the aim has been to maintain in the working solution a certain excess of nitrite, i.e., an amount which is more than sufficient for the purpose and the present invention is especially concerned with the provision of a novel method for controlling the addition of the soluble nitrite.

The type of phosphate coating solutions to which the invention is applicable usually contains phosphoric acid and metal salts of phosphoric acid. The most common metal so employed is zinc, but calcium is also employed. In various situations, it is desirable to increase the speed at which phosphate coating solutions will form suitable coatings on ferriferous surfaces. Such increase in speed is most commonly achieved by adding nitrate to the coating solution and such solutions are referred to as "nitrate-accelerated" coating solutions. Another customary practice for expediting coating speed is to add chlorate to the coating solutions and such solutions are called "chlorate-accelerated" coating solutions. A still further known method of accelerating the coating action is to utilize nitrite in the coating solutions in amounts such that it operates not only as an oxidizer of ferrous ion but also as an accelerator. In addition to the primary ingredients of the coating solutions, which include the acid, the metals which become part of the coating, and the accelerator, it is sometimes desirable and quite customary to include other additives in order to obtain various special effects. Among such additives may be mentioned fluorides, both simple and complex, metals such as copper and silver in traces, nickel in somewhat larger amounts, salts of polyphosphoric acids in relatively small amounts, etc.

While the method of the present invention is useful in connection with the general type of coating solutions discussed above, it is particularly useful with nitrate, chlorate and nitrite accelerated coating solutions, which solutions present a somewhat more severe control problem by reason of their rapid action. Except as particularly pointed out below, the usefulness of the method is substantially unaffected by the specific concentrations of the components of the coating solution, or by the presence and character of various subsidiary ingredients included in the solutions for such purposes as above indicated.

In the production of phosphate conversion coatings on iron and steel, a portion of the iron is dissolved and appears in the coating solution as ferrous ion. As the coating solution is reused on successive surfaces of iron or steel, ferrous ion tends to accumulate in the solution. It has been noted that a build-up in the ferrous ion concentration causes a degradation in the quality of the coatings produced by the solution. The most widely accepted manner of overcoming this difficulty is to add small amounts of nitrite to the coating solution for the purpose of oxidizing the ferrous ion to ferric ion, which latter forms an almost completely insoluble compound that settles out of the coating solution.

Experience has shown that it is desirable to maintain an excess of nitrite in the coating solution substantially continuously. The term "excess," in this context, means a level of nitrite material in the solution which is greater than that required to oxidize all of the ferrous ions entering the solution to the ferric state. In other words, experience has indicated that better quality coatings are produced if the level of nitrite is always maintained at a concentration higher than the amount stoichiometrically required to oxidize the ferrous ion present in the solution at any given instant. One of the reasons for maintaining an excess of nitrite in the solution as a whole is to assure that an adequate amount of nitrite is always available locally in the solution, for example in the part of the solution which is actually in coating contact with the metal surface at any given time. The desirable excess nitrite condition discussed here corresponds to a concentration of nitrite in the coating solution of between about 0.07 to about 0.28 g./l. expressed as sodium nitrite.

In a production line arrangement, the ferrous ions enter the coating solution more or less continuously, since work is being treated more or less continuously. The rate of entry of ferrous ions into the solution appears to be roughly proportional to the surface of metal exposed to the coating solution in a unit of time. This last rate, that is the rate of exposure of metal to the solution is called the "work loading." The rate at which nitrite is consumed is a function of the rate at which the ferrous ions enter the solution. Thus, it is desirable to add the nitrite continuously or at least in a manner which roughly approximates continuous addition.

Heretofore control of the rate at which nitrite is added to the solution has been exercised only indirectly, because no suitable means were available to determine directly the rate of entry of ferrous ions. The control parameter which has been employed in the scheme of indirect control is that of nitrite concentration. This concentration heretofore has usually been monitored by periodic manual titrations on the basis of which the quantity of make-up nitrite is adjusted.

The method just outline of titrating the coating solution to determine the nitrite concentration, and metering in the proper quantity of nitrite periodically to restore the concentration to the specified level is, at best, only an approximation to the ideal of continuous supply of nitrite for continuously oxidizing the ferrous ion which is constantly entering the solution from the work. Stated somewhat differently, the control of the nitrite component in coating solutions heretofore has been a manual art depending heavily upon the skill and judgment of the person operating the bath. Some operators use techniques which, when objectively considered, are not ideal, but from a practical standpoint have been considered more or less satisfactory. Thus, some operators habitually keep the coating bath rich in nitrite in order to have a reserve for emergency conditions. This procedure is wasteful of the material.

Another disadvantage of the practices outlined above for control of nitrite component is that they are not capable of mechanization and are always subject to human error as well as to the delay inherent in obtaining the reading. Furthermore, it has not been possible to adapt these indirect control procedures to mechanical operation because no method of measuring nitrite concentration in phosphate coating solutions has been known which can be readily performed mechanically.

It is the primary object of this invention to provide an improved method of oxidizing the ferrous ion entering phosphate coating solutions during the forming of conversion coatings on ferriferous material.

It is also an object of this invention to provide a method for controlling the feed rate of the nitrite component of an acid phosphate coating bath of the type described in order to obtain the best quality of coating possible in the most economic manner.

It is a further object of this invention to provide a method for controlling the operation of an acid phosphate coating bath utilizing nitrite which is rapidly responsive to changes in the demand for nitrite in the bath.

Still another object of the present invention is the provision of a method of controlling nitrite addition to acid phosphate coating baths which includes special steps for maintaining sensitivity of the measuring equipment.

A further object of the invention is the provision of a method for controlling the addition of nitrite to an acid phosphate coating solution under conditions where widely varying rates of metal processing, i.e., work loading, are encountered.

Still another object of the invention is the provision of special techniques for maintaining the effectiveness of an inert control electrode with only momentary interruption of its control function and without removing it from the solution which it is controlling.

The above objects and purposes together with any others which may appear hereinafter can best be understood by considering the detailed description which follows in connection with the accompanying drawings in which:

FIGURE 3 is a block diagram of a control system arranged in accordance with the present invention.

Figure 1:
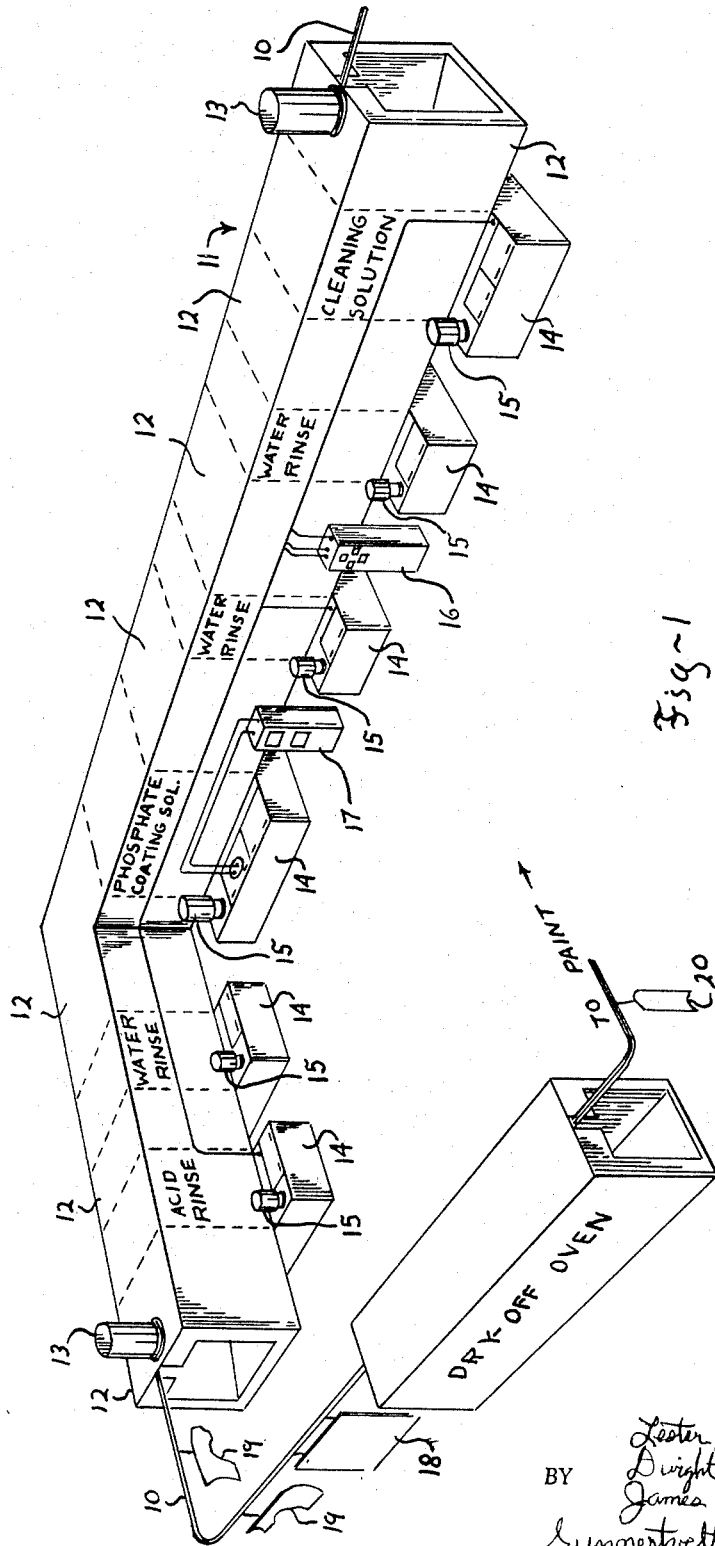
FIGURE 1 is a somewhat diagrammatic perspective view of a metal treating installation in which the methods of the present invention are employed.

This invention is centered about the following discovery: When the solution of a nitrite containing phosphatizing bath which is being employed to coat ferriferous metal is made part of a redox system including a reference electrode, the voltage developed across the redox system closely follows the work loading of the solution. Thus we have discovered that the signal developed by the redox system is a control parameter which makes it possible to attain the ideal of continuous supply of nitrite in appropriate quantities in response to the continuously developed demand for nitrite caused by the entry of ferrous ions into the solution at a rate which is a function of the work loading.

The redox systems by which the newly discovered control parameter is generated are effective throughout the range of preferred nitrite concentration in coating baths of the kind under consideration here. That is to say, the systems are effective in the range of about 0.07 g./l. to about 0.28 g./l. of nitrite expressed as sodium nitrite. The redox systems arranged in accordance with the invention are most effective in a slightly narrower or preferred range of nitrite concentration, namely from about 0.07 g./l. to about 0.22 g./l. When the concentration of nitrite in the coating solutions is above about 0.28 g./l. the redox systems of the invention do not generate a voltage which follows the work loading well enough to serve as a control signal. Those skilled in the art will realize that this is not a practical disadvantage, because, while it is possible to operate phosphate coating baths with wastefully high nitrite concentrations, it is not a good practice, since the quality of the coatings produced by such baths is not materially improved over the quality of coatings produced by a bath having nitrite within the preferred range, and in some respects the quality at the higher nitrite levels may even be reduced.

The mechanism underlying this discovery is not fully understood and there is no intention that the scope of this invention be limited by any speculation concerning the mechanism. Nevertheless, the following discussion is thought to summarize the relevant facts involved.

First, techniques are known in the art of titrating solutions, by which the concentration of oxidizable or reducible components is determined with the aid of a redox system. In these techniques the solution to be titrated and the titrating solution (as it is added) form the solution for one half-cell of the redox system. As the titration proceeds, a plot of steady state voltage versus the volume of titrating solution added, yields a gently sloping curve which is thought to be a function of the dominant equilibrium species in the solution. Upon the addition of an "equivalent volume" of titrating solution, a radical shift in the observed voltage takes place and as further amounts of titrating solution are added, another gently sloping curve of voltage versus volume of titrating solution is developed. The new curve is thought to be a function of the new dominant equilibrium species in the solution. The equivalent volume of titrating solution is identified as that volume at which the radical shift in voltage from one curve to another takes place.

Next, we have found that when a fresh phosphatizing bath of the type under consideration here is made the solution of one half-cell in a redox system in which the other half-cell is a reference electrode (such as a calomel cell), the voltage signal developed is substantially independent of the concentration of nitrite in the bath. The signal assumes a substantially constant value upon the addition of a very small amount of nitrite, and thereafter does not change upon further addition of nitrite. In other words, the gently sloping curve expected as a reflection of a dominant equilibrium system including nitrite ions and lower oxides of nitrogen is not developed. The reasons for this are not known, but it may be that another equilibrium system is masking the system involving nitrite. In any event, the lack of response of the voltage in the redox system to nitrite concentration makes the redox potential of the bath appear to be an unlikely candidate for a control parameter for the nitrite component of the bath.

Nevertheless, we have discovered that when a phosphatizing solution of the type discussed above containing nitrite is being worked, in the sense that it is being brought into coating contact with metal surfaces, the potential generated by the redox system rapidly falls from the nitrite insensitive valve which it had before the solution was worked. The steady state value attained by the voltage is sharply dependent on the work loading. Thus, in the absence of control steps of the kind disclosed below which are taken in response to the voltage, the voltage will fall as the work loading increases, and the voltage will rise as the work loading declines. This sensitivity to work loading remains as long as metal is being processed with the coating solution.

The voltage values observed during measurements on a coating solution which is being worked do not appear to be measurements of concentrations. Attempts to correlate observed voltages with independent measurements (as by titration) of nitrite level yield no meaningful results. Furthermore, the independent measurements of nitrite concentration indicate that it remains in the range where the redox potential is substantially completely insensitive to nitrite concentration, as described above, when work is not being processed. Finally, it has been observed that when processing of metal in a bath is stopped, the redox voltage climbs quickly back to the stable nitrite insensitive level mentioned above. That is to say, the voltage increases at a time when no nitrite is being added to the solution, and the nitrite concentration, if anything, is decreasing slightly as it oxidizes the small amount of ferrous ion remaining in the solution from the previous treatment of metal. Attempts to correlate the observed voltages with independent measurements of ferrous ion, which is transiently present in the solution during use, have also failed to yield meaningful results.

It is difficult to postulate a mechanism for the redox system, or, for that matter, for the coating bath as a whole, which adequately explains, even in a qualitative manner, the experimentally observed facts just outlined. It is believed that the observed voltage in effect detects a controlling reaction rate involving the ferrous ions which are transiently present in the solution. This theory accords well with the fact that the voltage follows the work loading.

Whatever the mechanism, it does appear that the redox voltage measurements made in accordance with the invention can be effectively utilized to control the rate of addition of material to the solution so that it is substantially equal to the rate at which nitrite is required by the solution for production of optimum coatings.

The redox voltage has a very high sensitivity to the work loading. This has a number of implications, some of which will be discussed in greater detail below in connection with particular control systems for coating baths. One general point is that because of the rapid response of voltage, one has a certain amount of freedom in selecting the particular voltage level used to trigger or otherwise operate nitrite replenishing equipment in a particular installation. Another point of some importance is the fact that when a control system is being set up in accordance with the invention, it cannot readily be calibrated by the use of the nitrite titration methods heretofore used for control purposes, because these methods are not sensitive enough. Thus, the preferred scheme for calibrating a control system utilizing the invention involves evaluating the quality of the work, that is the quality of the conversion coatings produced and correlating this factor with the control voltage level selected and the other variables involved in the control system. Under such a scheme, titrations for nitrite level may provide supplementary guidance even though they are not a main calibrating tool.

The treatment of sheet iron and steel to place conversion coatings on it is generally performed at one of two stages in the process of manufacturing sheet metal parts. Sometimes the steel is conversion coated before it is formed into sheet metal parts, that is, while it is still in strip or sheet form. In other manufacturing processes it is found to be most useful to form the sheet metal into a particular part, such as an automobile fender or hood, before placing the conversion coating on it. The present invention is applicable to conversion coating operations of both kinds although the particular arrangement for the practice of the invention may vary according to the kind of installation.

In the drawings there is illustrated a conversion coating installation of the kind designed to handle preformed sheet metal parts, such as the beforementioned automobile fenders. Before the illustrated conversion coating system is discussed, there will be described a small scale conversion coating installation utilizing the invention for coating continuous strips of sheet metal.

The installation for treating strip steel was designed to handle strip 3⅛″ wide. The treating system was provided with a zinc phosphate bath of about 125 liters held in a tank through which the continuous strip steel was drawn at a substantially uniform rate of about 7.5 feet per minute. The path of movement of the steel was arranged to completely immerse it in the tank for thorough contact between the coating solution and the steel. As discussed above, an important factor in the consumption of materials in the bath is the area of steel which is treated. For this reason, it is often useful to express the processing rate or work loading rate in terms of area. The above lineal speed of 7.5 feet per minute of 3⅛″ wide strip yields a loading rate of approximately 7.1 square feet per gallon of solution per hour.

The phosphatizing bath utilized during experiments on this installation was of known type having a zinc content of from about 1.0 to about 1.5 g./l., a free acid titration value of 0.8, a pH of approximately 3.1 and a nitrate concentration from about 2 to about 10 g./l. Experience with coating baths of this type indicated that an appropriate level of nitrite under the operating conditions outlined above would be about 0.145 g./l. expressed as sodium nitrite.

A pair of electrodes were immersed in the bath to establish a redox system. The inert electrode was platinum (Leeds & Northrup Standard 1199–60) having an area of about 2 square centimeters. The reference electrode was a so-called saturated calomel electrode (Leeds & Northrup #117–105). The voltage developed in the redox system was measured by a standard 500 millivolt recorder controller of the self-balancing potentiometer type.

A pump was provided for delivering make-up nitrite to the bath from a separate supply container of sodium nitrite solution. The pump was operated in response to signals from the controller. It was found that under the operating conditions outlined above, this particular system produced optimum quality coatings with a redox voltage of about 250 millivolts. Such a voltage level added nitrite at a rate which maintained the concentration at the desired level of 0.145 g./l. ± 0.015 g./l., within the limits of analytical accuracy. The controller was set so that when the redox potential dropped to 248 millivolts the nitrite pump was turned on. The pump was turned off by the controller when the redox voltage reached 250 millivolts. Thus it can be seen that the redox voltage in this installation was used as a control parameter in an on-off type control system, and that the high sensitivity of the redox potential was fully exploited by starting and stopping the addition of nitrite upon relatively small variations in the redox potential.

In order to change the level of nitrite maintained by the control system for a given loading rate in this type of system, it is only necessary to change the voltage at which the nitrite replenishing pump is actuated. Thus to increase the nitrite concentration, the on and off voltage should be set at a value higher than 250 millivolts. Similarly, if it is desired to hold the nitrite level at a lower value, the triggering voltages for turning the pump on and off should be set at a level below 250 millivolts.

During operation of this installation it was noted that when the nitrite replenishing pump was triggered to operate at a particular set of redox voltage values, an increase or decrease in the loading rate was accompanied by a shift in the concentration of nitrite in the direction of the change in loading rate. Thus with the replenishing pump set to turn on at 248 millivolts and off at 250 millivolts, an increase in the loading rate above the 7.1 square feet per gallon of solution per hour rate discussed above resulted in an increase in the concentration of sodium nitrite established and maintained by the control system. From this it can be seen that the values of redox potential useful for controlling the operation are not absolute, and are not absolute even for a given bath, but rather are relative values dependent on a number of factors, principally the loading rate or the rate at which metal is processed.

Attention is now directed to FIGURE 1 which is an overall diagrammatic view of a familiar metal treating installation designed to handle sheet metal parts such as automobile fenders, quarter panels, hoods and the like. The parts to be treated are carried on an overhead conveyor 10 which extends through the treating installation, the dry-off oven, and the paint booths which latter are not shown. As can be seen in the drawing, the metal treating installation consists of a tunnel 11. Various sections of the tunnel are provided with spray nozzles, and the several treating solutions are sprayed onto the work as it passes through these sections. The solutions after contacting the work fall back into supply tanks which are located beneath each spray section. Between the spray sections of the tunnel are interposed separator sections 12. Such separations are desirably placed between the various treating sections so that the mist which accompanies the spray in each section does not migrate into the next treating section. The floor of the tunnel in the various separator sections is pitched slightly so that solution accumulating on it runs into one of the adjacent supply tanks. Exhaust lines 13 are provided at each end of the treating installation to carry off the spray and mist which would otherwise tend to escape into the factory room.

Each treatment section has a supply tank 14 which extends under the tunnel and protrudes in front of the tunnel somewhat. For each tank there is a pump 15 which draws liquid from the tank and forces it through the spray risers in the treatment section. The spray after contacting the work then falls back into the tank and is thus recirculated. Make-up chemicals are added to the several tanks by pumps and other equipment which are not shown in the simplified view of FIGURE 1.

As can be seen in FIGURE 1, work enters the treating installation at the right and leaves it to proceed to the dry-off oven at the left. The first treating section is one which sprays cleaning solution on the parts. The purpose of this treatment step is to remove grease, cosmoline, dirt, chalk marks, loose scale, and the like from the sheet metal parts. Such dirt is a natural result of the forming and storage operations involved in making the parts which are to be treated. The cleaning solution is usually a water solution of an alkaline material such as trisodium phosphate or sodium carbonate. It may also contain surface active agents, anti-foaming agents, etc.

The second treatment stage is a water rinse for flushing the dirt and cleaning solution from the surface of the parts. Similarly, the third stage is a water rinse to complete the cleaning treatment in preparation for the conversion coating. As the water in the two rinse stages is recirculated, the concentration of dirt, etc., tends to build up. Therefore, it is preferred to constantly overflow a portion of the rinse water from the second stage into the plant sewer and to overflow a portion of the water from the third stage into the second stage. Make-up water is thus added to the third stage.

The fourth treatment section or stage is the phosphate coating stage. This stage will be discussed in fuller detail later herein.

The fifth stage is a water rinse for removing excess coating solution from the surfaces which have been treated. This rinse stage is quite similar to the second and third water rinse stages. The sixth or final treatment stage is an acid rinse. In this stage a dilute solution of an acid, such as chromic acid, is sprayed on the freshly coated parts to stabilize and passivate the freshly formed conversion coating. The work, after leaving the acid rinse stage, is conveyed to a conventional dry-off oven and thence to the painting booths.

Various control techniques have been developed for automatically controlling the operation of the cleaning stage and the rinse stages. A control unit 16 is diagrammatically indicated for these stages, but this control unit need not be discussed in detail here since it does not per se form part of the present invention. A separate control unit, arranged in accordance with the invention, is provided for the phosphate coating solution stage. This control unit is shown diagrammatically at 17 in FIGURE 1.

The conveyor 10 moves at a substantially constant speed and, for design purposes, advantage can be taken of this fact to appropriately proportion the various stages to provide the proper residence time of parts passing through them. The constant speed of the conveyor 10 imposes a unity upon the installation from a control standpoint, since each stage of the overall treating operation must be controlled to adequately perform its function on the parts carried at the uniform speed by the conveyor.

In a typical plant, the treating installation receives parts in a fairly irregular manner which is dictated by the production scheduling of the plant and not primarily by considerations arising from the treating installation. Thus, a variation in the work load can be caused by a change in the kind of parts moving through the installation, such as a change from automobile hoods indicated at 18, to automobile fenders indicated at 19, or to parts for gasoline tanks indicated at 20. Another variable which is often introduced into the work load is the spacing between parts, or, stated differently, the number of parts treated per unit of time. Furthermore, gaps of considerable length may occur between one batch of parts on the conveyor 10 and the next. Finally, conditions in the plant, either in the treating installation, the dry-off oven, in the painting booths, or in the paint drying oven may make it necessary to stop the conveyor 10, which runs through all of these pieces of equipment, for various indeterminate time periods. From this brief outline of the operation of a typical phosphate coating installation for handling individual pieces of sheet metal work, it can be seen that such an operation presents a much more severe control problem than does a continuous strip treating installation, because of the inevitable wide variation in the work load.

Figure 2:
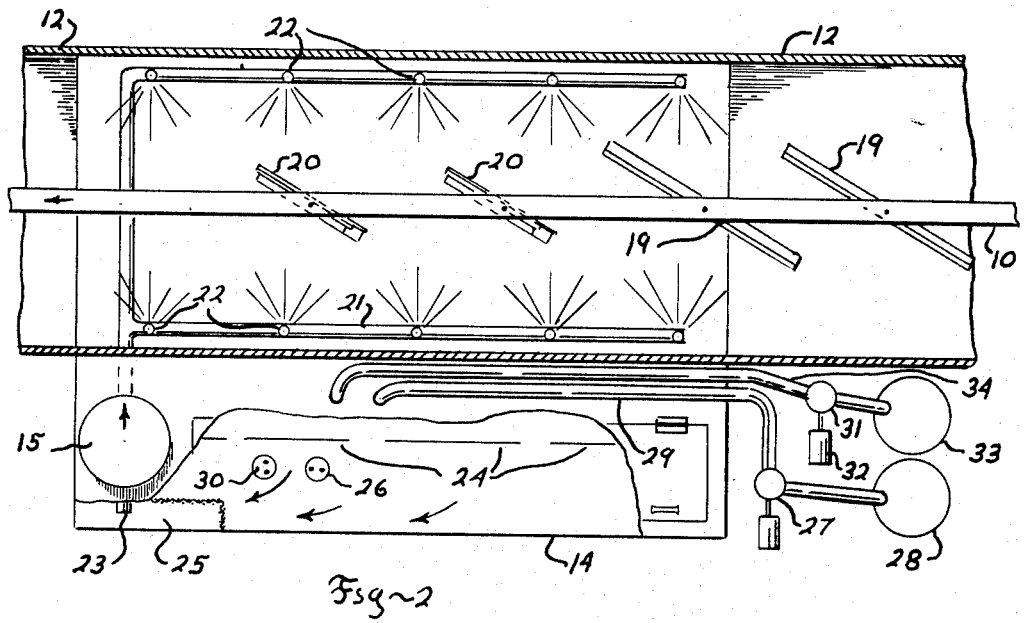
FIGURE 2 is a plan view, partially in section, and somewhat diagrammatic, of the phosphate conversion coating bath portion of the treating installation shown in FIGURE 1.

FIGURE 2 shows in plan view, and somewhat diagrammatically, the phosphate coating solution stage of the treating installation of FIGURE 1. The tank 14 is almost full of treating solution. The solution circulates from pump 15 through the lines 21 to the spray risers 22. The coating material passes through spray nozzles spaced along the vertical risers, and contacts the work pieces 20 and 19 moving along the conveyor 10 in the direction shown by the arrow. The solution, after contacting the work, falls down into the tank 14 and circulates toward the intake 23 of pump 15. In order to reach the intake of the pump, the solution must traverse baffles 24 and filter screen 25.

Two control probes are provided. Probe 26 measures a parameter which indicates the level of the coating materials in the bath, and the signal from this probe is used to control the operation of replenishing pump 27 for delivering make-up phosphate coating materials from make-up drum 28 through line 29 to the bath. This part of the installation control system does not form part of the present invention and will not be further discussed.

The second control probe 30 carries the redox electrodes utilized in accordance with the present invention. This probe may be positioned at any convenient point in the bath and could even be located outside of tank 14, with the solution of the bath being supplied to it by auxiliary lines. However, it is important that the probe be so positioned that it contact solution of the bath which is active or being worked in the sense that it is, or has recently been, in contact with the work pieces. In a well designed phosphate coating stage, there will be no substantial areas of the treating bath which are stagnant and which are not active in the sense used above, since solution which is not being utilized for coating purposes is in effect being wasted. In such a well designed installation, there will be no substantial problem in locating the probe 30 where signals of suitable sensitivity are generated. In general, it is preferred to locate the probe 30 where it will contact solution just after it comes from the work pieces since the best sensitivity is obtained at that location.

The probe 30, controls, in connection with equipment to be discussed later, the pump 31 driven by motor 32. The pump 31 delivers make-up sodium nitrite solution through line 34 to the coating bath. It is preferred that line 34 (and for that matter line 29) be positioned to deliver make-up material to the bath at a point up stream from the control probe 30 (and probe 26). By so locating the nitrite make-up input, the inertia of the control system is reduced.

FIGURE 3 is a simplified block diagram illustrating the arrangement of the control equipment which has successfully been utilized to overcome the severe control problems presented by the widely varying loading rates encountered in the kind of installation shown in FIGURES 1 and 2. The probe 30 is shown quite diagrammatically in FIGURE 3, where it can be seen that it is made up of a calomel electrode 40, an inert platinum electrode 41, and an auxiliary platinum electrode 42. The electrodes 40 and 41 are connected to the recorder controller 43, which is of the self-balancing potentiometer type and which monitors the voltage of the redox voltage. The recorder controller 43 also generates a written record of the redox voltage on a moving sheet of paper. The nitrite make-up drum 33, the nitrite pump 31 and its motor 32 all appear on FIGURE 3 also.

Because of the wide variation in the loading rate for the system of FIGURES 1 and 2, it has been found that no single rate of addition of nitrite is completely satisfactory for supplying nitrite at a rate equivalent to that at which it is consumed under all conditions in response to the redox voltage. For this reason, in accordance with the invention, the redox voltage is employed to initiate addition of make-up material at two different rates. In some installations, it may be desirable to use more than two different rates of addition of make-up material, while in others only one rate of addition may be necessary.

In the control system of FIGURE 3, the steady state voltage for the bath in the unloaded condition is about 460–500 millivolts. That is to say, this is the voltage which is observed in the particular system when no work has recently been processed. Two timer switches T-1 and T-2 control the operation of motor 32. (Both T-1 and T-2 can be adjusted to varying ratios of "on-time" and "off-time.") Timer T-1 is arranged to turn the motor on for a period of 20 seconds and then to hold the motor in an off position for the balance of a 5 minute period. Timer T-2 is arranged to turn motor 32 on for a longer period such as 30 to 90 seconds and then to hold the motor in an off position for the balance of a different period such as two minutes. Since the motor drives pump 31 at a substantially constant rate during the time it is on, it can be seen that this arrangement of timers provides for two substantially different rates of addition of nitrite.

The recorder controller, for the installation of FIGURE 1, was set to initiate operation of timer T-1 whenever the voltage fell below about 420 millivolts. The controller was set to initiate operation of timer T-2 whenever the voltage fell below about 320 millivolts. The 420 millivolt triggering voltage was selected so that the rate of addition resulting from the 420 millivolt triggering point and the timing cycle of timer T-1 resulted in the addition of nitrite at a rate equivalent to the demand for nitrite when the loading rate was at the smallest value commonly encountered. The triggering voltage of 320 millivolts, and the rate of addition established by timer T-2 in response to that voltage resulted in the addition of nitrite at an appropriate rate for a considerably higher loading rate.

With the control system arranged with the triggering voltages set out above and the timing constants set out above, it has been found that the excess sodium nitrite level in the bath, as detected by titration, did not vary by more than about 0.037 g./l. from the high point to the low point, during variations in the loading rate from about ⅓ sq. ft./gal. hour to about 3 sq. ft./gal. hour.

The inclusion in the feeding cycle of time periods when the motor 32 is held in the off position, even through the redox voltage may momentarily drop to the triggering voltage, introduces a desirable stability factor in the control system and provides enough system inertia so that there is no excessive hunting and no substantial danger of the system running away in the direction of adding an undesirable large excess of nitrite.

Figure 4:
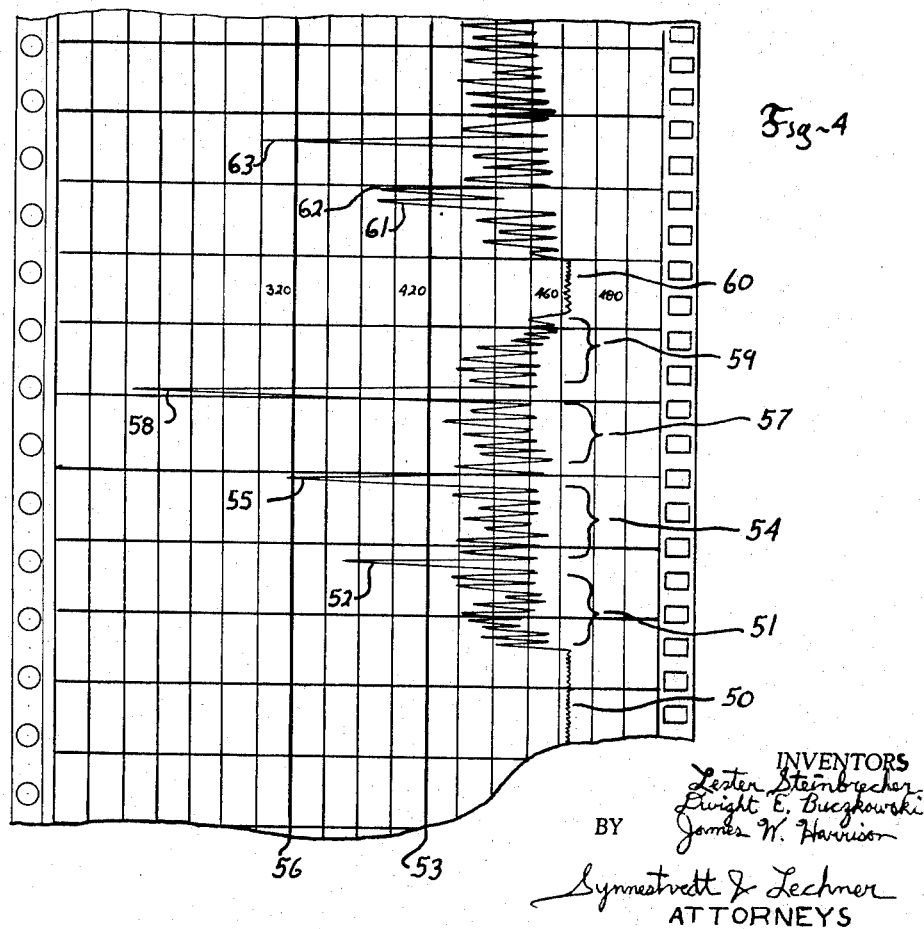
FIGURE 4 is a replica of a voltage plot made by control equipment arranged according to the invention.

FIGURE 4 presents in somewhat idealized form a plot of the redox voltage similar to the plots produced by the recorder controller 43. The chart is so organized that increasing time is measured in the up direction, and the scale to the right of the 420 millivolt line is expanded somewhat for clarity.

The section of the voltage trace near the bottom of the graph at 50 reflects a time when no work is being treated in the installation. The indicated voltage is the beforementioned substantially constant voltage, insensitive to nitrite level, which is encountered when the bath has not recently been in contact with work.

The section of the voltage trace indicated by the bracket 51 reveals the redox voltage conditions occurring during treatment of work. The variations in the voltage are not fully explainable and represent changes in the redox conditions more subtle than can be detected by other standard control measurements such as nitrite titrations. At 52 the voltage fell below the 420 millivolt line 53. This caused timer T-1 to be actuated and fresh nitrite was added to the bath. The portion of the voltage trace indicated by bracket 54 represents normal operation in the desired range, and for practical purposes the voltage in this range may be regarded as substantially constant.

At this point in the operation, the loading rate suddenly increased and the amount of nitrite required increased. The voltage fell fairly precipitously, not only below the 420 millivolt level, but below the 320 millivolt level to the point 55. The 320 millivolt line is marked 56. This downward excursion of the voltage triggered operation of timer T-2 and caused addition of nitrite to the bath at a greater rate. Thus the voltage levels returned to the normal range in the region indicated by the bracket 57. The sharp downward excursion of the voltage traced at 58 represents a cleaning step which will be discussed later. No nitrite is added as a result of this excursion.

Normal oscillations in the desired range occur through the period indicated by the bracket 59, but at the end of this time period the processing of work was halted temporarily. Thus the voltage drifted back up to the maximum level once again as at 60. When work resumed once again, the voltage varied within the desired range, eventually falling below the 420 millivolt level as at 61. Once again, timer T–1 was actuated and nitrite was added. The voltage momentarily fell below the 420 millivolt line shortly thereafter at 62, but since timer T–1 was still blocking operation of motor 32, no nitrite was added as a result. Finally, the voltage fell below the 320 millivolt line at 63 and timer T–2 was operated to add make-up nitrite to bring the voltage back into the desired range.

As mentioned before, the old control means, namely control by titration of nitrite, was not sensitive enough to serve as the sole calibrating or tuning tool for the control system used on the installation of FIGURE 1. The triggering voltages and the constants for the timers were determined empirically by processing work through the system at varying rates and evaluating the quality of the coatings produced at different nominal excess nitrite levels and at different triggering voltages and addition rates. While the particular values are illustrative of those to be expected in various installations, they do not have a generalized significance. Each installation will have its own set of key control system numbers.

Both of the control system installations discussed herein utilized electrodes including a calomel electrode as the reference half-cell and a platinum electrode as the inert member. Other electrodes can be used if desired and we have developed the following simple system for determining whether a given set of electrodes will be satisfactory. The electrodes to be tested are immersed in a beaker containing a sample of a phosphatizing bath containing nitrite, which bath is of the kind in which the electrodes will eventually be used if satisfactory. A specific redox voltage signal will be generated if the electrodes are operative. A small amount of ferrous ion as ferrous sulfate, for example, is then added to the sample in the beaker. If there is an immediate fall in the potential following the addition of ferrous ion, the set of electrodes being evaluated will be satisfactory for use in a control system. If the potential does not fall, then the electrode system is not satisfactory. We have found that besides the preferred calomel-platinum system, the following systems are satisfactory: gold-calomel, and carbon (arc light carbon)-calomel. Other reference electrodes can be used with inert electrodes, but the saturated calomel type is quite satisfactory.

The "inert" indicator electrode, during continuous use, gradually becomes somewhat sluggish in its response to changing conditions in the coating solution. This sluggishness is associated with its acquisition of a more or less adherent coating, consisting largely of ferric phosphate and probably also including other materials derived from the constituents of the solution. In accordance with the invention, the electrode is cleaned periodically so that the changing characteristics of the electrode as a result of the coating do not become a variable which must be taken into account in the control system. Various cleaning procedures can be employed, including mechanical and chemical methods of the kind well known to analytic chemists. However, we have developed a special cleaning procedure, by means of which the cleaning can be accomplished without removing the electrodes from the bath, and with only the briefest interruption in the functioning of the inert electrode as a control element.

For a better understanding of the preferred cleaning procedure, attention is directed to FIGURE 3. In that figure, it can be seen that a D.C. power supply 65 is provided. In addition, control timer T–3 is provided. The detailed operation of this equipment will be given below, but first there will be outlined the general cleaning procedure which is accomplished by the equipment. The timer T–3 and the power supply are arranged so that at selected intervals a D.C. voltage is placed across electrodes 41 and 42, that is across the inert control electrode and the supplementary platinum electrode. The control electrode 41 is made anodic with respect to the supplementary electrode 42. As a result of this voltage a current flows between the electrodes; the current density is preferably in the range of 0.25 to 1 ampere per square centimeter. The effect which has been observed as a result of this cleaning step is that a gas is evolved at electrode 41 and the film breaks up. The gas tends to break the film away from the electrode and dissipate it.

The control electrode 41 is maintained anodic for a few seconds, such as 4 to 6. If the cleaning process is stopped at this point, the control electrode 41 will appear to be clean and bright, but we have found that it is passive for some reason and unable to perform satisfactorily in the control system. The next step in the cleaning procedure is to make the control electrode 41 cathodic for a few seconds, such as 2 to 4 seconds. During this step gas is again evolved at electrode 41. The current density for this portion of the cleaning procedure is preferably at about the same level as for the prior portion.

The preferred arrangement of the equipment for performing the above cleaning procedure is shown diagrammatically in FIGURE 3. The self-balancing potentiometer type recorder controller 43 has a pair of binding posts or terminals 43a for input of the control voltage signal which is developed between electrodes 40 and 41. The controller 43 is also provided with a pair of binding posts or connections which form part of the well-known internal circuitry of the controller. Such internal circuitry includes, for example, the potentiometer balancing motor which drives the recording pen of the controller.

Timer T–3 is shown as a unit driven by synchronous motor M–3, carrying five cams on a common shaft 66, the cams being positioned to operate switches which are biased against the cam surfaces. If desired, the functions performed by timer T–3 can be performed by other types of timing devices. The several cams of timer T–3 are marked *a* through *e*; the cam operated switches are similarly marked SW–*a* through SW–*e*.

As is known, by adjusting the angular positions of the cams with respect to a reference point, and with respect to one another, a definite timed sequence of operation of switches SW–*a* through *e* can be established. A complete cycle including all of the steps in the sequence so established will be carried out upon the rotation of the cam shaft through one revolution.

A review of FIGURE 3 will show that the internal circuit of the recorder controller 43 is connected to the timer T–3 through switch SW–*a* and binding posts 43b. Thus opening of switch SW–*a* will interrupt the internal circuit and render the various parts of it inactive. In particular, the potentiometer balancing motor which drives the recorder pen will be stopped when SW–*a* is open.

FIGURE 3 also shows that electrodes 40 and 41 are connected to the controller 43 through binding posts 43a. The connection of electrode 40 is made directly, but electrode 41 is connected to the binding post through switch SW–*b*. Thus opening of switch SW–*b* will disconnect electrode 41 from the input side of controller 43.

The D.C. power supply 65 is connected to electrodes 41 and 42 at appropriate times through switches SW–*c*, SW–*d* and SW–*e*. As shown on FIGURE 3 when SW–*e* is closed, the positive side of the D.C. voltage is passed to switch SW–*d*. Depending on the position of switch SW–*d*, the positive voltage is placed either at electrode 41 or at electrode 42. The negative side of the voltage from the power supply 65 is connected to the switch arm of switch SW–*c*. Depending on the position of this switch, it is either passed to electrode 42, or, to electrode 41.

The operation of timer T–3 to accomplish the cleaning procedure outlined generally above can best be understood by considering the following tabular description of an operating cycle. The particular time intervals contained in the table are not to be taken as critical, but are illustrative of the timing factors which have proved to be practical. In a particular installation, one skilled in the art might find it useful to employ a somewhat different set of time factors.

| Time | | Operations |
|---|---|---|
| Min. | Sec. | |
| 0 | 00 | Time cycle begins. |
| 0 | 00+ | (1) Cam a opens switch SW-a, and thus stops the balancing motor, etc., of recorder controller 43 through connections 43b. |
| 0 | 00+ | (2) Cam b opens switch SW-b, thereby disconnecting electrode 41 from controller 43. |
| 0 | 05 | (3) Cam e closes switch SW-e, thereby connecting the positive side of D.C. power supply 65 to electrode 42, the connection being made through switch SW-d. The negative side of power supply 65 is at the same time connected to electrode 41 through switch SW-c. |
| 0 | 10 | (4) Cam c throws switch SW-c and cam d throws switch SW-d. In this way the positive side of power supply 65 is connected to electrode 41 and the negative side to electrode 42. |
| 0 | 13 | (5) Cam e opens switch SW-e, thereby removing the D.C. voltage from electrodes 41 and 42. Cams c and d actuate switches SW-c and SW-d to return them to their starting positions in preparation for the new cycle. |
| 0 | 59 | (6) Cam b closes switch SW-b thereby reconnecting electrode 41 to the controller. |
| 0 | 60 | (7) Cam a closes switch SW-a, thereby reestablishing the circuit for operating the balance motor of controller 43 and other portions of the internal circuit thereof. |

The present invention has been disclosed above in connection with two particular metal treating installations which are thought to be typical of the kinds of environments in which the invention is of great utility. However, it is not limited in its scope to the particular details of the two installations or to the specific baths which have been described. In fact the invention is useful in connection with all acid phosphate conversion coating baths containing zinc and/or calcium ions such as are familiar in the coating of ferriferous surfaces, where the ferrous ion which accumulates from the work is removed from the bath by the addition of nitrite.

We claim:
1. In the art of forming a conversion coating on ferriferous metal surfaces wherein a succession of said surfaces are subjected to the action of an acid phosphate coating bath containing metal ions from the class consisting of zinc and calcium, the method of oxidizing ferrous ion which tends to accumulate in the bath to the ferric form which method comprises introducing a pair of redox electrodes, one of which is inert and the other of which is a reference electrode, into bath solution, measuring the potential developed by the electrodes while metal surface is being coated, and adding nitrite bearing material as required to maintain the measured potential at desired value while work is being processed.

2. In the art of forming a conversion coating on ferriferous metal surfaces wherein a succession of said surfaces are subjected to the action of an acid phosphate coating bath containing metal ions from the class consisting of zinc and calcium, the method of oxidizing ferrous ion which tends to accumulate in the bath to the ferric form which method comprises continuously subjecting a pair of redox electrodes, one of which is inert and the other of which is a reference electrode, to the action of the bath while said surfaces are being coated, whereby to develop a potential across said electrodes, and initiating addition of nitrite bearing material to said bath when said potential falls below preselected value.

3. A method according to claim 2 and further including the step of discontinuing addition of nitrite bearing material to said bath when the potential rises to another preselected value greater than said first mentioned preselected value.

4. In the art of forming a conversion coating on ferriferous metal surfaces wherein a succession of said surfaces are subjected to the action of an acid phosphate coating bath containing metal ions from the class consisting of zinc and calcium, the method of oxidizing ferrous ion which tends to accumulate in the bath to the ferric form which method comprises continuously subjecting a pair of redox electrodes, one of which is inert and the other of which is a reference electrode, to the action of the bath while said surfaces are being coated, whereby to develop a potential across said electrodes, initiating addition of nitrite bearing material to said bath when said potential falls below preselected value, and further including the steps of continuing addition of said nitrite bearing material to said bath for a preselected time interval after initiation thereof, and of preventing further initiation of addition of said nitrite bearing material to said bath for a second preselected tme interval after each such initiation even if the potential falls to said preselected value during said second preselected time interval.

5. A method according to claim 1 and further including contacting the solution of said bath with a second inert electrode, periodically impressing a first potential across said inert electrodes with the first inert electrode being made anodic with respect to the second for a preselected time, thereafter impressing a second potential across said inert electrodes with the first inert electrode being made cathodic with respect to the second for a preselected time.

6. A method according to claim 1 wherein the inert electrode is periodically cleaned.

7. A method according to claim 1 wherein a current is periodically flowed through the inert electrode into the bath for a brief period of time.

8. A method according to claim 7 and further including the step of flowing a current through the inert electrode out of the bath for a brief time period following the flow of current into the bath.

9. A method in accordance with claim 7 wherein the current flow is effected by introducing a second inert electrode into bath solution adjacent the first electrode and placing a voltage from an external source across the two inert electrodes.

10. In the art of forming a conversion coating on ferriferous metal surfaces wherein a succession of said surfaces are subjected to the action of an acid phosphate coating bath containing metal ions from the class consisting of zinc and calcium and wherein said surfaces are fed to the bath at varying loading rates, the method of oxidizing ferrous ion which tends to accumulate in the bath to the ferric form which method comprises continuously subjecting a pair of redox electrodes, one of which is inert and the other of which is a reference electrode, to the action of the bath while said surfaces are being coated, whereby to develop a potential across said electrodes, initiating addition of nitrite bearing material to said bath at a first rate when said potential reaches a first preselected value, said first rate of addition and first potential value being selected with regard to each other and with regard to the least of said varying loading rates so as to insure addition of sufficient nitrite to properly coat ferriferous surfaces at said least loading rate, and initiating addition of nitrite bearing material to said bath at a second rate, greater than said first rate of addition, when said potential reaches a second preselected value, said second rate of addition and second potential value being selected with regard to each other and with regard to a loading rate greater than the least of said rates to insure addition of sufficient nitrite to properly coat ferriferous surfaces at said greater loading rate.

11. In the art of forming a conversion coating on ferriferous metal surfaces wherein a succession of said surfaces are subjected to the action of an acid phosphate coating bath containing metal ions from the class consisting of zinc and calcium and, further, wherein ferrous ion accumulating from the work is oxidized to the ferric form by the addition of nitrite to the bath at a rate sufficient to maintain its concentration from about 0.7 g./l. to about 0.28 g./l.; the method of correlating the addition of nitrite with demand therefor as metal surfaces are being treated and ferrous ion is being oxidized to the ferric form which method comprises continuously subjecting a pair of redox electrodes, one of which is inert and the other of which is a reference electrode, to the action of the bath while the surfaces are being coated, whereby to develop a potential across said electrodes and initiating addition of nitrite bearing material to the bath as required to maintain said potential substantially constant at that predetermined value which maintains the said nitrite concentration.

12. The method of claim 11 in which the upper limit of nitrite concentration does not exceed 0.22 g./l.

13. In the art of forming a conversion coating on ferriferous metal surfaces wherein a succession of said surfaces are subjected to the action of an acid phosphate coating bath containing metal ions from the class consisting of zinc and calcium and accelerating additive from the class consisting of nitrate, chlorate and nitrite; the method of oxidizing ferrous ion which tends to accumulate in the bath to the ferric form which method comprises introducing a pair of redox electrodes, one of which is inert and the other of which is a reference electrode, into bath solution, measuring the potential developed by the electrodes while metal surface is being coated, and adding nitrite bearing material as required to maintain the measured potential at desired value while work is being processed.

14. A method for maintaining the effectiveness of an inert control electrode which is immersed in an acid phosphate coating solution to be controlled, said solution being of the kind containing metal ions from the class consisting of zinc and calcium and which electrode during control operations in the solution has operating potentials with respect to a reference electrode, which method comprises immersing a third electrode in the solution and periodically making the control electrode anodic with respect to the third electrode and thereafter making the control electrode cathodic with respect to the third electrode, by impressing voltages from an external source across said control electrode and third electrode.

References Cited

UNITED STATES PATENTS

| | | | |
|---|---|---|---|
| 2,805,191 | 9/1957 | Hersch | 204—1.1 |
| 2,898,282 | 8/1959 | Flook et al. | 204—1.1 X |
| 2,912,367 | 11/1959 | Asendorf et al. | 204—195 X |
| 3,095,121 | 6/1963 | Douty et al. | |
| 3,178,320 | 4/1965 | Henricks | 148—6.15 |
| 3,179,581 | 4/1965 | Lewin et al. | 204—1.1 X |
| 3,214,301 | 10/1965 | Pocock et al. | 148—6.2 |
| 3,294,593 | 12/1966 | Wyszomirski | 148—6.15 |
| 3,312,189 | 4/1967 | McVey | 118—7 |

FOREIGN PATENTS 606,382   8/1948   Great Britain.

RALPH S. KENDALL, *Primary Examiner.*